(12) United States Patent
Seydoux et al.

(10) Patent No.: US 6,188,222 B1
(45) Date of Patent: Feb. 13, 2001

(54) METHOD AND APPARATUS FOR MEASURING RESISTIVITY OF AN EARTH FORMATION

(75) Inventors: Jean P. Seydoux, Sugar Land; Jacques R. Tabanou, Houston, both of TX (US)

(73) Assignee: Schlumberger Technology Corporation, Sugar Land, TX (US)

(*) Notice: Under 35 U.S.C. 154(b), the term of this patent shall be extended for 0 days.

(21) Appl. No.: 09/148,013

(22) Filed: Sep. 4, 1998

Related U.S. Application Data

(60) Provisional application No. 60/059,554, filed on Sep. 19, 1997.

(51) Int. Cl.$^7$ ............................... G01V 3/28; G01V 3/34; E21B 49/00
(52) U.S. Cl. .................. 324/339; 340/853.6; 340/855.5; 175/50
(58) Field of Search .................................. 175/45, 48, 50; 324/338, 339, 333, 341, 342, 343, 347, 351, 356, 360, 369; 340/853.4, 854.6, 855.4, 855.5, 854.8; 73/152.03, 152.45; 166/250.01, 254.2

(56) References Cited

U.S. PATENT DOCUMENTS

| | | |
|---|---|---|
| 3,967,201 | 6/1976 | Rorden . |
| 4,363,137 | 12/1982 | Salisbury . |
| 4,800,385 | 1/1989 | Yamazaki . |
| 4,899,112 | 2/1990 | Clark et al. . |
| 5,117,927 | 6/1992 | Askew . |
| 5,157,605 | 10/1992 | Chandler et al. . |
| 5,160,925 | 11/1992 | Dailey et al. . |
| 5,163,521 | 11/1992 | Pustanyk et al. . |
| 5,235,285 * | 8/1993 | Clark et al. ............................ 324/342 |
| 5,339,036 * | 8/1994 | Clark et al. ............................ 324/338 |
| 5,339,037 | 8/1994 | Bonner et al. . |
| 5,359,324 * | 10/1994 | Clark et al. ......................... 340/854.3 |
| 5,375,098 | 12/1994 | Malone et al. . |
| 5,410,303 | 4/1995 | Comeau et al. . |
| 5,448,227 * | 9/1995 | Orban et al. ...................... 340/854.4 |
| 5,467,832 | 11/1995 | Orban et al. . |
| 5,594,343 | 1/1997 | Clark et al. . |
| 5,602,541 | 2/1997 | Comeau et al. . |
| 5,646,611 | 7/1997 | Dailey et al. . |
| 5,883,516 * | 3/1999 | Van Steenwyk et al. ........... 324/366 |

FOREIGN PATENT DOCUMENTS

| | | |
|---|---|---|
| 2 292 869 | 3/1996 | (GB) . |
| 2 313 393 | 11/1997 | (GB) . |
| WO 87/04028 | 7/1987 | (WO) . |
| WO 97/27502 | 7/1997 | (WO) . |

OTHER PUBLICATIONS

U.S. application No. 60/059,554, Seydoux and Tabanou, filed Sep. 1997.*

* cited by examiner

*Primary Examiner*—Christine K. Oda
*Assistant Examiner*—Henry S. Andersen
(74) *Attorney, Agent, or Firm*—Brigitte L. Jeffery; Wayne Kanak

(57) ABSTRACT

The method and apparatus of the invention determines earth formation resistivity at extended depths into the formation by the use of telemetry transmission signals to measure the formation resistivity. The telemetry transmission signals carry measurement data from downhole sensors through the formation to an uphole receiver. The signal transmission is by means of induction telemetry. At the receiver, the signal is demodulated to obtain the transmitted measurement data. During the detection of the signal at the receiver, the signal amplitude is also extracted and is used to determine the formation resistivity. In addition, changes in the signal amplitude are also used to indicate formation boundaries for determining well location during directional drilling.

34 Claims, 14 Drawing Sheets

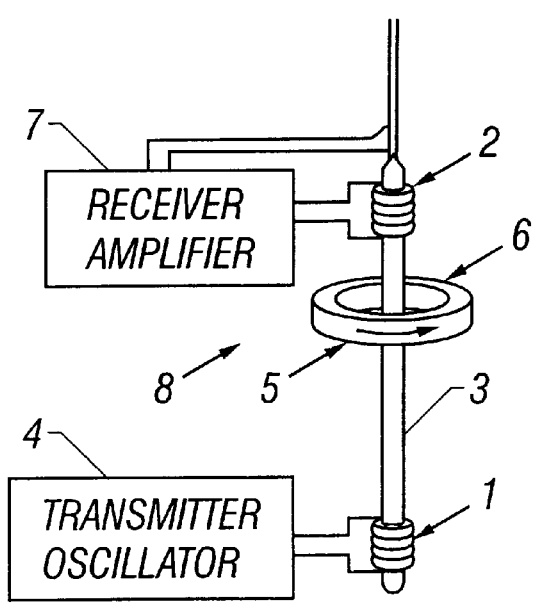
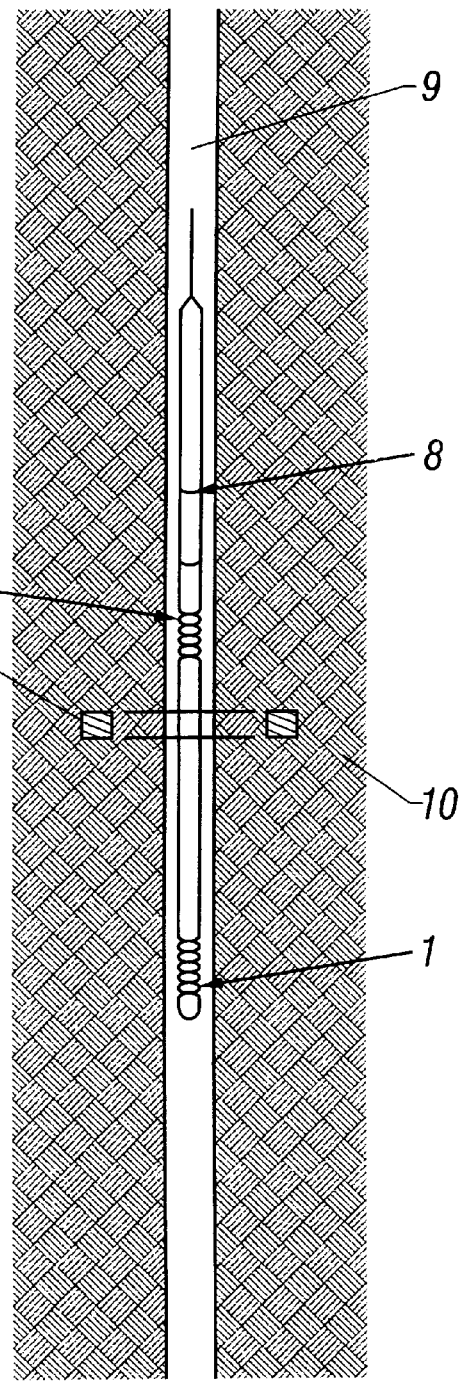
FIG. 1
(Prior Art)
FIG. 2
(Prior Art)

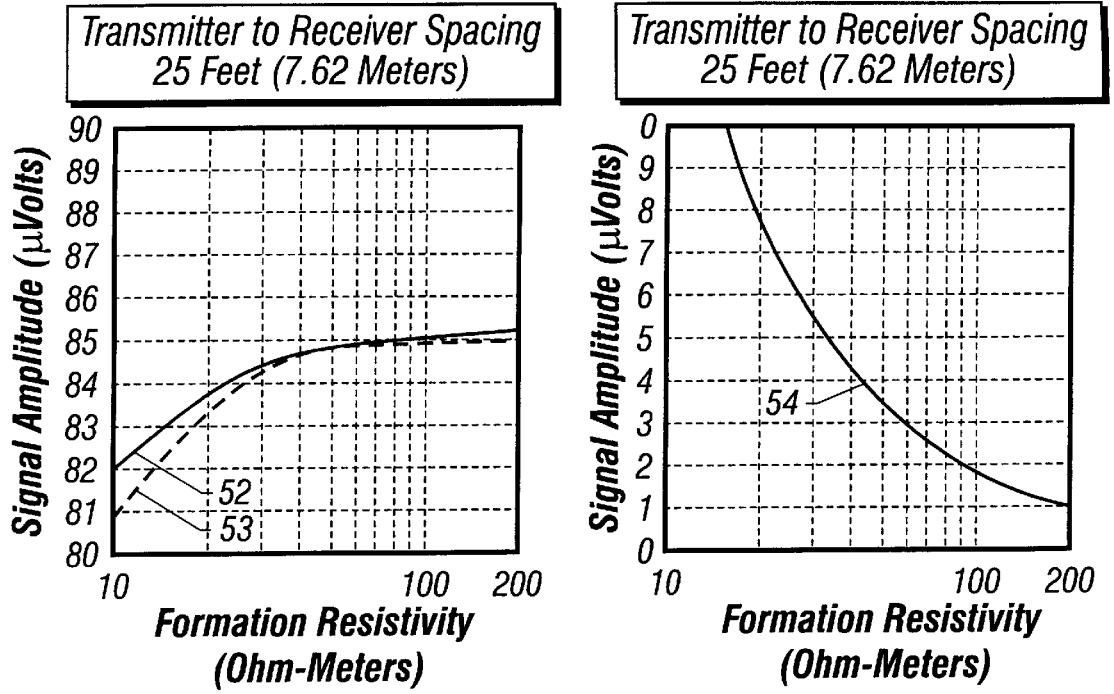
FIG. 15A
FIG. 15B
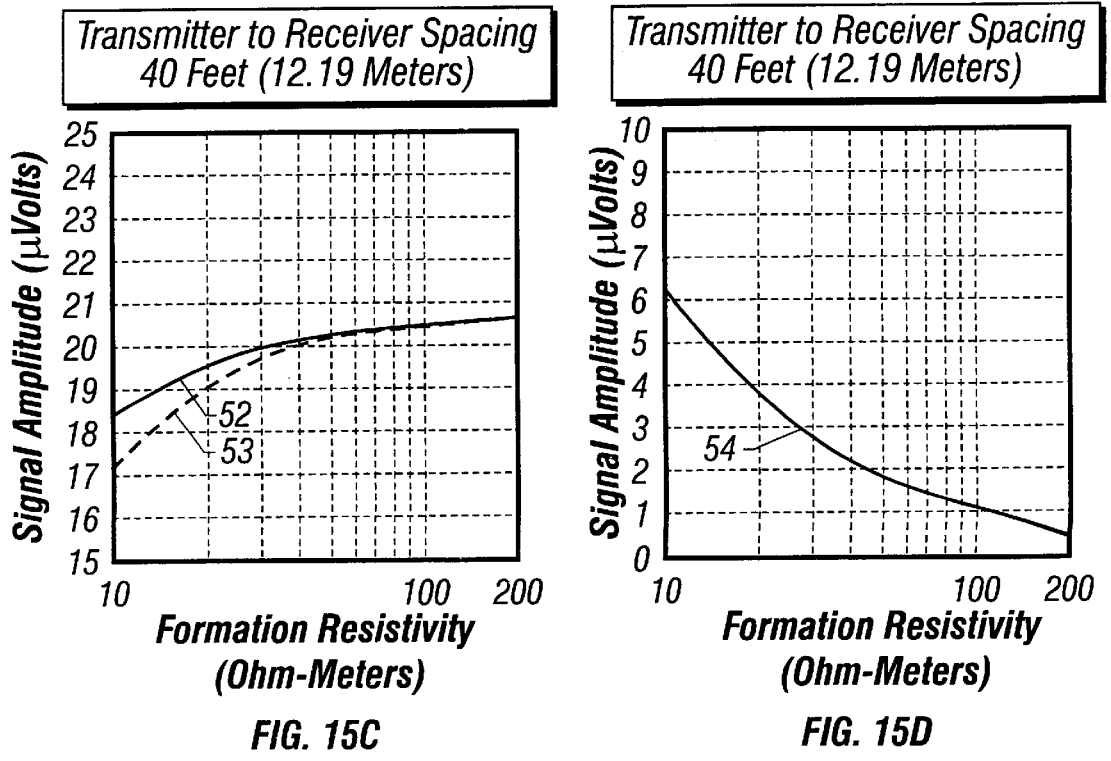
FIG. 15C
FIG. 15D

METHOD AND APPARATUS FOR MEASURING RESISTIVITY OF AN EARTH FORMATION

CROSS-REFERENCE TO RELATED APPLICATION

This application claims priority from Provisional Application Ser. No. 60/059,554, filed on Sep. 19, 1997, the contents of which are incorporated herein by reference.

BACKGROUND OF THE INVENTION

1. Field of the Invention

This invention relates to the field of well logging and, more particularly, to a method of determining earth formation resistivity in real-time and at extended depths of investigation into the formation. A form of the invention has general application to the well logging art, but the invention is particularly useful in logging while drilling (LWD) and directional drilling applications.

2. Description of the Related Art

Resistivity logging, which measures the electrical resistivity of formations surrounding a borehole, is a commonly used technique for formation evaluation. Porous formations having high resistivity generally indicate the presence of hydrocarbons, while other porous formations having low resistivity are generally water saturated. Wireline well logging makes resistivity measurements in a borehole (with the drill string removed) by lowering a logging device into the borehole on a wireline cable and taking measurements with the device while withdrawing the cable. This resistivity measurement technique uses various arrangements of sensors and detectors, on the logging device and at the earth's surface, to measure electrical currents and/or potentials from which one derives formation resistivity.

During the directional drilling of a well in an earth formation it is necessary to determine the trajectory of the well in order to ensure that the well is being drilled in the desired direction. To accomplish the task of determining the well trajectory drillers take several measurements of the drill bit and borehole conditions during the drilling process. These downhole measurements include the inclination and direction of the borehole near the bit, which are essential for maintaining accurate control over borehole trajectory. During the drilling process knowledge of formation properties can be useful in connection with borehole trajectory control. For example, identification of a "marker" formation, such as a layer of shale having properties that are known from logs of previously drilled wells and which is known to lie a certain distance above the target formation, can be used to great advantage in selecting where to begin curving the borehole to ensure that a certain radius of curvature will indeed place the borehole within the targeted formation. A shale formation, for example, can generally be detected by its relatively high level of natural radioactivity, while a sandstone formation having a high salt water saturation can be detected by its relatively low electrical resistivity. Once the borehole has been curved so that it extends generally parallel to the bed within the target formation, these same measurements can be used to determine whether the borehole inclination in the target formation is too high or too low.

The focus of the present invention is in the area of measuring formation resistivity during drilling operations. Resistivity measurements typically involve one of several techniques. The first of these techniques uses a system of toroids and electrodes. An electrical current is generated at a toroidal transmitter and passes into the formation. The current travels through the formation and an electrode positioned at a distance away from the transmitter detects the current or voltage drop. The formation resistivity is derived from the current and/or voltage measurement. This electrode resistivity measurement technique is described in U.S. Pat. Nos. 5,235,285; 5,339,036; 5,339,037; and 5,359,324, which are incorporated herein by reference.

A second technique for measuring resistivity is an electromagnetic wave propagation measurement which measures the phase shift and/or attenuation of a signal between a pair of receivers. Examples of this technique are described in U.S. Pat. No. 4,899,112 and 5,594,343, which are incorporated herein by reference.

A third type of resistivity measurement is the induction technique. This technique utilizes a system of coils wrapped around a metallic or non-metallic mandrel and is described in U.S. Pat. No. 5,157,605, which is incorporated herein by reference. With the induction technique, the signal at the receiver is proportional to the conductivity of the formation. The signal is generated by inducing currents in the formation and detecting voltage at the receiver.

These techniques are commonly used to determine formation resistivity with maximum radial depth of investigation roughly equal to the maximum transmitter to receiver distance in the logging apparatus. The maximum depth of investigation for typical wireline logging and LWD systems is therefore generally limited to about 6 to 8 feet (1.8 to 2.4 meters) due to cost-driven and practical limitations on tool length.

Referring again to the induction technique, induction tools employ alternating currents in transmitter coils to set up an alternating magnetic field in the surrounding conductive earth formation. This changing magnetic field induces current loops in the earth formation which themselves produce a secondary magnetic field that is detectable as a voltage by a receiver coil placed at a distance from the transmitter coil.

Generally, induction tools consist of multi-coil arrays designed to optimize vertical resolution and depth of investigation. FIGS. 1 and 2 schematically illustrate a basic two-coil wireline induction tool 8 deployed in a borehole 9. A two-coil tool comprises a transmitter coil 1 and receiver coil 2 mounted coaxially on a mandrel 3. Typical coil separations range from 1 to 10 feet (0.3 to 3.0 meters). In practice, each coil may consist of from several to a hundred or more turns, with the exact number of turns determined by design considerations. A transmitter oscillator 4 controls the operating frequency of the induction tool 8 which is generally in the tens of kiloHertz (kHz) range, with 20 kHz being the most commonly used frequency. The transmitter coil 1 induces a current 5 in the earth formation 10 which is detected by the receiver coil 2. This current forms a ground loop 6 around the tool. Receiver amplifier 7 amplifies the received signal, from the secondary magnetic field generated by the sum of all the ground loops in the formation, for processing and further transmission uphole.

In spite of the fact that induction is referred to as a "resistivity" measurement, the voltage induced in a receiver coil, with the direct mutual signal removed by design, is actually directly proportional to the earth formation conductivity rather than to the earth formation resistivity. Contributions to the total conductivity signal from various individual regions of the formation sum electrically in parallel, because the currents generated by the coaxial coil arrangement all flow parallel to one another.

In addition to measuring formation resistivity, electrode and induction techniques have other applications associated with logging while drilling operations. One such application is downhole telemetry, which uses these techniques in the transmission of measurement data uphole to a receiver and eventually to the surface for interpretation and analysis. Electrode telemetry is implemented by means of a transmitting toroidal coil antenna disposed on the tool body which is energized to induce a current representative of measured data which current travels in a path that includes the tool body and the earth formation. The tool also has an electrode disposed on the body a distance from the transmitter. The electrode detects an electrical signal resulting from the induced current and obtains the measurement data from the detected current. This telemetry system is disclosed in further detail in U.S. Pat. No. 5,235,285.

Effective downhole electrode telemetry must overcome several obstacles caused by the electrical characteristics of the borehole and formation. During drilling and logging operations drilling fluid passes through the tool to the drill bit. Drilling fluid also fills the borehole annulus between the logging tool and the borehole wall. If this drilling fluid is oil-based and consequently electrically resistive, it will affect the signal strength during transmission. Still another obstacle can be a very resistive formation or very conductive thin layers embedded in a resistive formation. These types of layers are especially troublesome during telemetry operations. Very resistive formations severely restrict the flow of current. This restriction of current is analogous to an electrical open circuit. Where conductive formation layers are embedded in a resistive formation the flow of current to the receiver is prevented by the conductive layers acting as a short circuit or creating a current pinching effect. Another obstacle to transmission of signals uphole is the use of equipment, such as stabilizers, on the drill collars between the transmitter and receiver. Such equipment can act as an electrical short which prevents the telemetry signal from reaching the receiver.

Downhole induction telemetry overcomes several of the obstacles encountered by electrode telemetry. A typical induction telemetry system comprises a transmitting antenna and a modulator positioned at a first location downhole. A signal modulated to carry data acquired by one or more measurement sensors is applied to the transmitting antenna to induce a magnetic field about the location. A receiving antenna, positioned at a second location uphole, intercepts a portion of the magnetic field induced by the transmitting antenna and produces a signal that is demodulated to yield the transmitted data.

The present invention comprises a method and apparatus for providing a real-time deep resistivity measurement of earth formations with a depth of investigation ranging from approximately 25 to 60 feet (7.6 to 18.3 meters) from the measuring instrument. The present invention also describes an apparatus and method providing an improved telemetry system for sending measurement data uphole. The resistivity measurement is derived from the induction telemetry signal transmitted uphole.

It is therefore an object of the invention to measure formation resistivity at relatively deep radial depths of investigation from the measuring device.

It is another object of the invention to effect a resistivity measurement using the telemetry signal that carries data of measured parameters uphole to a receiver.

It is another object of the invention to detect formation boundaries while drilling, especially in directional drilling applications.

It is a further object of this invention to provide for more effective formation resistivity measurements and data transmission in the presence of electrically resistive borehole fluids.

SUMMARY OF THE INVENTION

The present invention comprises a method and apparatus for measuring earth formation resistivity during the drilling process. It will be understood that conductivity, being the reciprocal of resistivity, may be used interchangeably with that term in this specification. The technique of the present invention uses the wireless induction telemetry signal being sent uphole containing drilling information and other logging measurement information to effect a formation resistivity measurement. In the telemetry process, a transmitter generates a magnetic induction field in the earth formation that corresponds to the measurement data. The path of the transmitted signal is at a relatively deeper radial depth into the formation than the measurement signal of conventional logging tools. This relatively deeper signal path provides sensitivity to formation resistivity at greater depths of investigation into the formation. A deeper resistivity measurement gives the driller a better picture of the surrounding formation for controlling drilling, information which is especially useful in directional drilling operations. The deeper path of the signal is the result of the increased distance between the transmitter and the receiver which is achieved by placing these components in widely separated locations on the drill string, rather than in a single tool. To further increase the transmitter to receiver distance the transmitter may be positioned in close proximity to the drill bit in a drilling assembly, and may preferably be positioned in the bit box that connects the drill bit to the rest of a bottom-hole assembly (BHA). Such an arrangement is described in U.S. Pat. No. 6,057,784 wherein an extended bit box connects the drill bit to a drilling motor via a drive shaft then passes through a bearing section. The bit box contains instrumentation to take measurements during drilling of a borehole. The bit box also contains telemetry means for transmitting the collected data via the earth formation to a receiver in the measurement-while-drilling tool. The receiver may be part of a measurement while drilling (MWD) tool or may be placed in a separate sub. In order to increase the transmission strength in view of the increased travel distance of the signal, both transmitter and receiver are loaded with a ferrite core. The present invention uses the telemetry signal carrying drilling measurement and logging data uphole to determine formation resistivity. During the transmission process the measurement and logging data are modulated and transmitted as data frames, such as 10 millisecond, 10 kHz pulses, via induction telemetry to a receiver located uphole from the transmitter. Electronics associated with the receiver demodulates the signal yielding the measurement and logging data. Each pulse is demodulated by correlation with a reference 10 kHz signal. The demodulated signal and its quadrature are then squared and summed to be phase insensitive. The receiver electronics also detects the amplitude of the telemetry signal. The amplitude of the telemetry signal is used to determine the resistivity of the surrounding formation by means of resistivity modeling.

Because of the depth into the formation of the transmission, the borehole and shallow formation conditions do not affect the deep formation signal transmission to a large degree. Therefore, the present invention overcomes the telemetry problems encountered under the borehole and shallow formation conditions described above.

BRIEF DESCRIPTION OF THE DRAWINGS

The present invention will be better understood with reference to the appended drawings wherein:

FIG. 1 is a schematic illustration of the fundamental components of an induction measurement apparatus;

FIG. 2 is a schematic illustration of the fundamental components of an induction measurement apparatus deployed in a borehole;

FIGS. 15a, 15b, 15c, and 15d are plots of the real and imaginary signal resistivity transform at various signal levels and transmitter to receiver spacings;

DESCRIPTION OF THE PREFERRED EMBODIMENT

Figure 3:
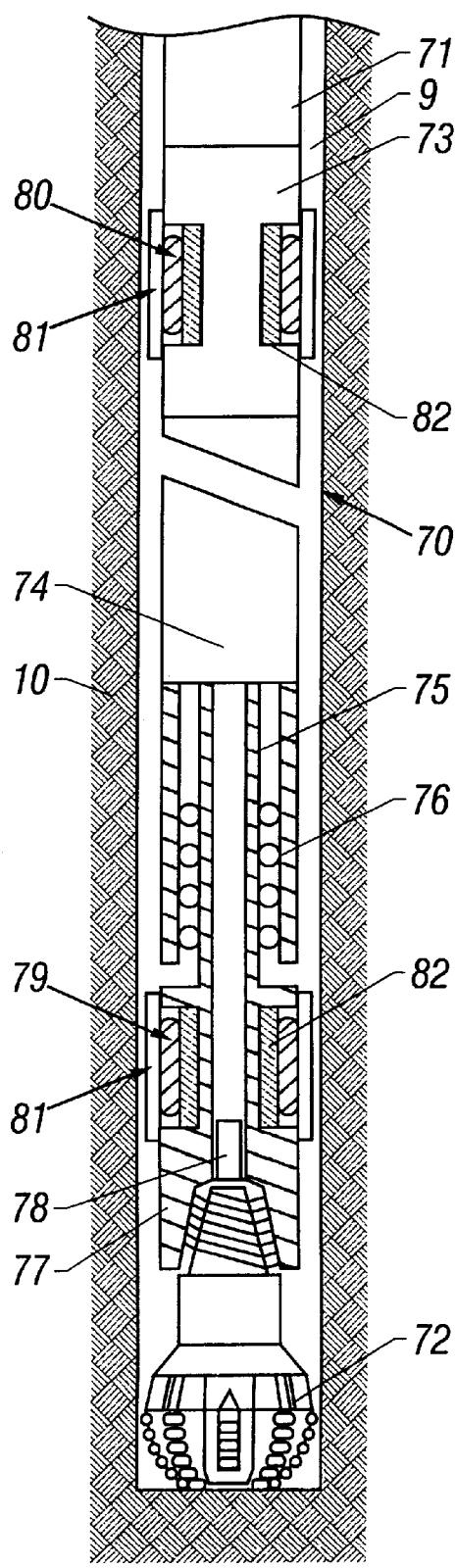
FIG. 3 is a schematic illustration of the apparatus of the present invention deployed in a borehole.

The preferred embodiment of the present invention is implemented in a logging and measurement while drilling system. Referring to FIG. 3, the apparatus of the present invention is represented schematically in a borehole in an earth formation. A bottom-hole assembly (BHA) 70 for drilling a straight or directional borehole 9 in an earth formation 10 is suspended by means of a drill string 71 which is supported at the earth's surface by a drilling rig (not shown). The drilling rig provides power to rotate the drill string 71 and includes a mud pump to force pressurized drilling fluid downward through the bore of the drill string 71. The drilling fluid exits the BHA 70 through ports in the drill bit 72 and returns to the earth's surface for reinjection by the mud pump. The BHA 70 typically comprises a measurement while drilling (MWD) tool 73 and a positive displacement type drilling motor 74 which drives a bit shaft 75. The bit shaft 75 is supported by bearings 76 and includes at its downhole end an extended bit box 77 into which the drill bit 72 is threaded. Additionally, the drilling motor 74 may incorporate a bent housing to facilitate the drilling of directional wells. It will be understood that the BHA 70 may comprise other components in addition to those enumerated above, such as for example stabilizers and logging while drilling tools.

Mounted within the extended bit box 77 is an instrumentation and electronics package 78 which is battery-powered. The instrumentation and electronics package 78 contains instruments for making measurements during drilling and may include magnetometers for monitoring the direction of the borehole, accelerometers for monitoring the inclination of the borehole, and/or formation evaluation instruments. Mounted on the extended bit box 77 is a transmitter coil 79 for transmitting telemetry signals carrying encoded data from the various measuring instruments through the earth formation 10 to a receiver coil 80 mounted in the MWD tool 73. It will be understood that the transmitter coil 79 may be mounted in a separate sub and that MWD tool 73 may be placed at various locations within the BHA 70, such placement determining the depth to which the received telemetry signals penetrate the earth formation 10. The transmitter coil 79 and the receiver coil 80 are protected from damage by shields 81 and are each loaded with a ferrite core 82 to increase the transmission range of the system. Finally, the instrumentation and electronics package 78 also carries the electronics necessary to encode the data from the measuring instruments and actuate the transmitter coil 79.

The invention uses the amplitude of the induction telemetry signal that transmits logging and drilling data obtained during the drilling of a borehole to determine earth formation resistivity. The transmitter coil 79 induces a signal in the earth formation 10 that corresponds to the measured logging and drilling data. The receiver coil 80 detects this signal and electronics associated with the receiver coil 80 recover the measured data for transmission to the earth's surface by means of a mud pulse telemetry system in the MWD tool 73 or in a separate sub. Such a mud pulse telemetry system is described in U.S. Pat. No. 5,375,098, which is incorporated herein by reference. Before proceeding with the description of the invention, and to assist in understanding the invention, some basic concepts related to signal transmission are reviewed.

Figure 4:
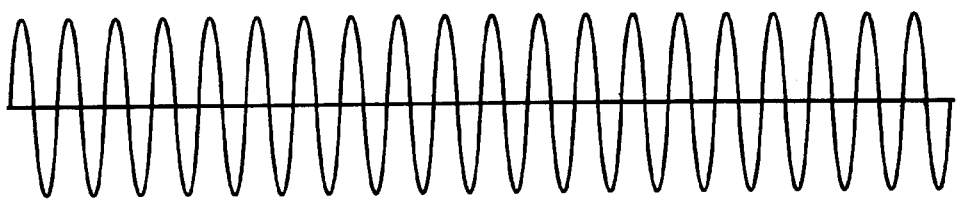
FIG. 4 is a diagram of an unaltered continuous carrier signal.
Figure 5:
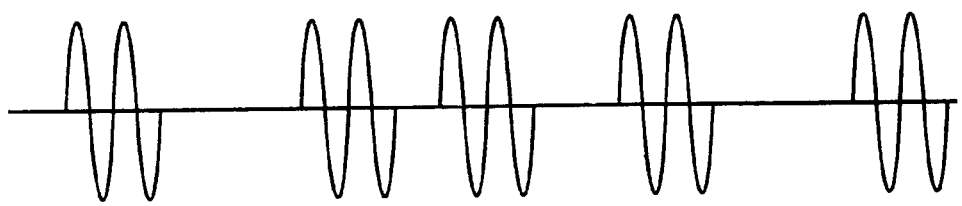
FIG. 5 illustrates a modulated carrier signal containing drilling and logging information.

As shown in FIG. 4, signal transmission begins with the use of a continuous oscillating signal of arbitrary amplitude and frequency that carries no intelligence. This continuous signal is called a "carrier signal" or simply a "carrier". The carrier may be interrupted or the signal amplitude altered so it becomes similar to a series of pulses that correspond to some known code as shown in FIG. 5. At this point the oscillating interrupted signal can carry some intelligence. In the present case, the intelligence is the measurement data. There are many ways to alter the carrier signal. Modulation is the process of altering a carrier signal in order to transmit meaningful information. The type of modulation that is utilized in the present invention is Pulse Position Modulation (PPM). PPM uses a pulse time arrival position in a data train to represent quantitized values of data. The characteristics of pulses within a pulse train may also be modified to convey the information.

Figure 6:
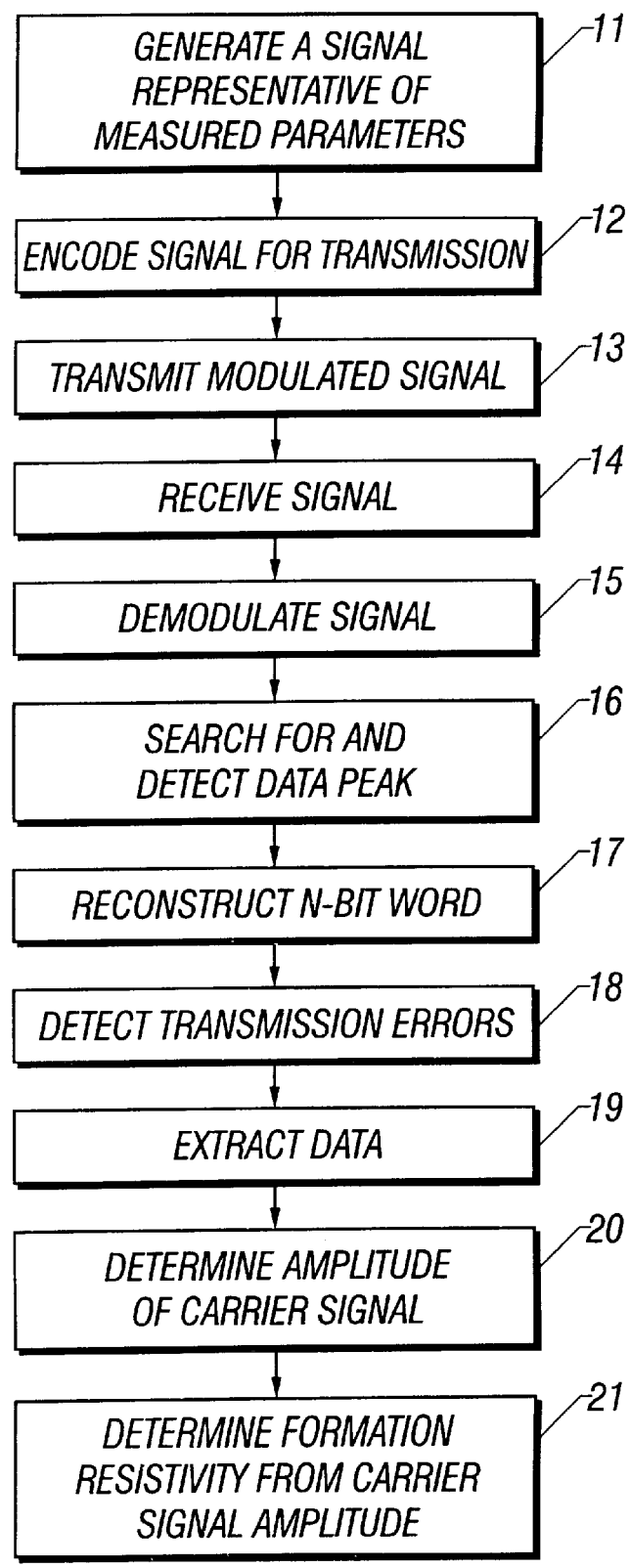
FIG. 6 is a flow diagram of the operation of the present invention.

Focusing again on the present invention, FIG. 6 shows the sequence of operations used to determine formation resistivity. Data is gathered from measurements taken during a drilling operation. The first step 11 is to generate a signal representative of the measured parameters. This signal is in digital form and is a conversion of an analog measurement. To transmit this signal to the uphole receiver it is necessary to encode the signal (box 12). The encoding process produces a 27 bit word for transmission.

Figure 7:
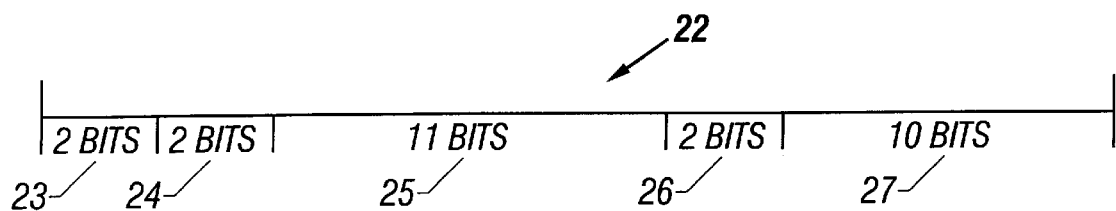
FIG. 7 is an illustration of a 27 bit word for data transmission uphole.

FIG. 7 illustrates a 27 bit word 22 that is ready for transmission to an uphole receiver. As shown, this word may comprise several fields containing various types of data. In this example, a 2 bit field 24 serves as a frame counter of the number of frames transmitted uphole. This field identifies each transmitted frame to permit better tracking of the transmitted data. Field 23 is a 2 bit field that serves as the frame type field and identifies the type of measurement data in the word. This data could be one of several measured characteristics such as temperature or bit inclination. Field 25 is an eleven bit field that contains the actual measurement data. For example, an inclination measurement of 238 milli-g, which equals 76.2 degrees, would be 00011101110 in field 25. Field 26 has two bits and indicates, for example, the shock level at bit. In addition to the transmission of measurement data, the bit stream may contain error detection bits. These additional bits of the bit stream help detect if an error occurred during the transmission of the data stream and verifies that the data sent was the data received. Error detection schemes are commonly used in digital transmissions. The particular error detection scheme may vary from using only one bit to several bits depending upon the desired level of detection. The last field 27 in this word is a ten bit error checking field that assists in verifying accurate transmission of the data.

Referring again to FIG. 6, the next step 13 is to transmit the signal uphole. This transmission involves modulating the signal using PPM techniques. As will be discussed in detail below, the 27 bit word is transmitted uphole in a data frame. Encoded pulses contain the information of the 27 bit word. Each pulse contains a 10 kHz signal. The position of each pulse in the data frame represents a portion of the data in the 27 bit word.

Figure 10A:
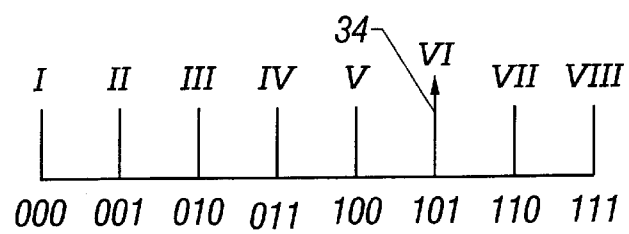
FIGS. 10a, 10b, and 10c illustrate various pulse positions within a data region based on various bit sequences.
Figure 10B:
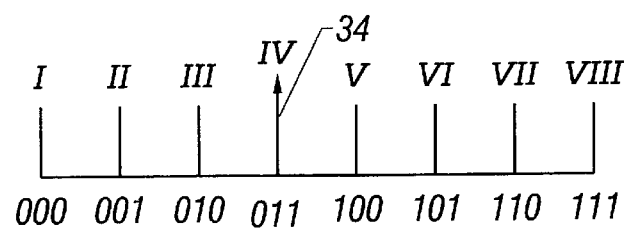
Figure 10C:
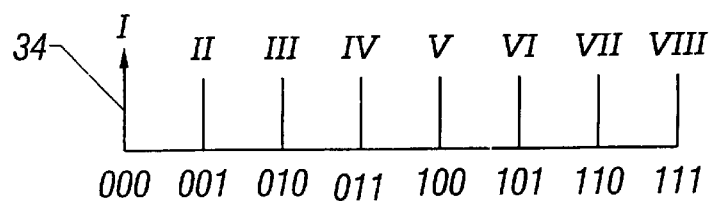
Figure 8:
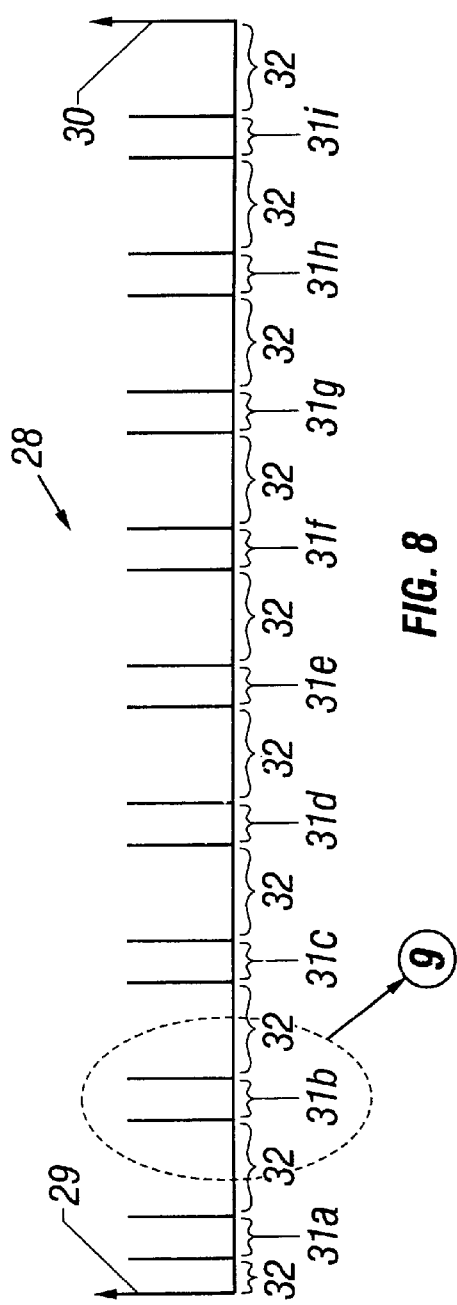
FIG. 8 is an illustration of a pulse position modulated data frame transmitted to a receiver.
Figure 9:
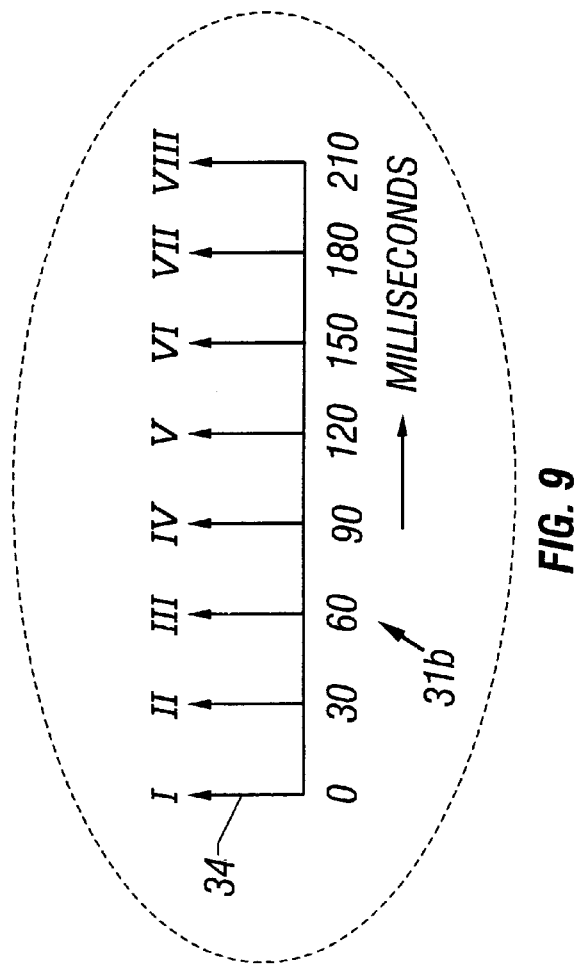
FIG. 9 is a diagram of the pulse positions in a data region of the data frame of FIG. 8.

FIG. 8 illustrates the format of the transmitted and detected data in a PPM scheme. The transmitter sends one data frame approximately every two minutes. The data frame 28 consists of eleven 10 kHz pulses. The data is encoded by using pulse position. The first pulse 29 and last pulse 30 are synchronization pulses that indicate the beginning and end of the data frame 28. The remaining pulses occur in data regions 31a–31i. The data regions are separated by intervals 32 of two seconds in length as shown. Referring to FIG. 9, each data region comprises multiple positions within the region in which a pulse 34 may occur. Each data pulse position corresponds to one of eight symbols whose value corresponds to the pulse delay position. There are seven possible delay positions of 30 milliseconds or eight possible pulse positions I, II, III, IV, V, VI, VII, and VIII. In an example of the transmission of the 27 bit word of FIG. 7, each of the nine information pulses represents three bits of the 27 bit word. The data frame 28 contains these nine pulses plus the two synchronization pulses 29 and 30. As shown in FIG. 10a, if the first three digits of the 27 bit word are "101" the first data region would have a pulse 34 in the sixth position. A three digit sequence of "011" in FIG. 10b would result in a pulse 34 in the fourth data region. A sequence of "000" in FIG. 10c would result in a pulse 34 in the first position of the data region.

Figure 11:
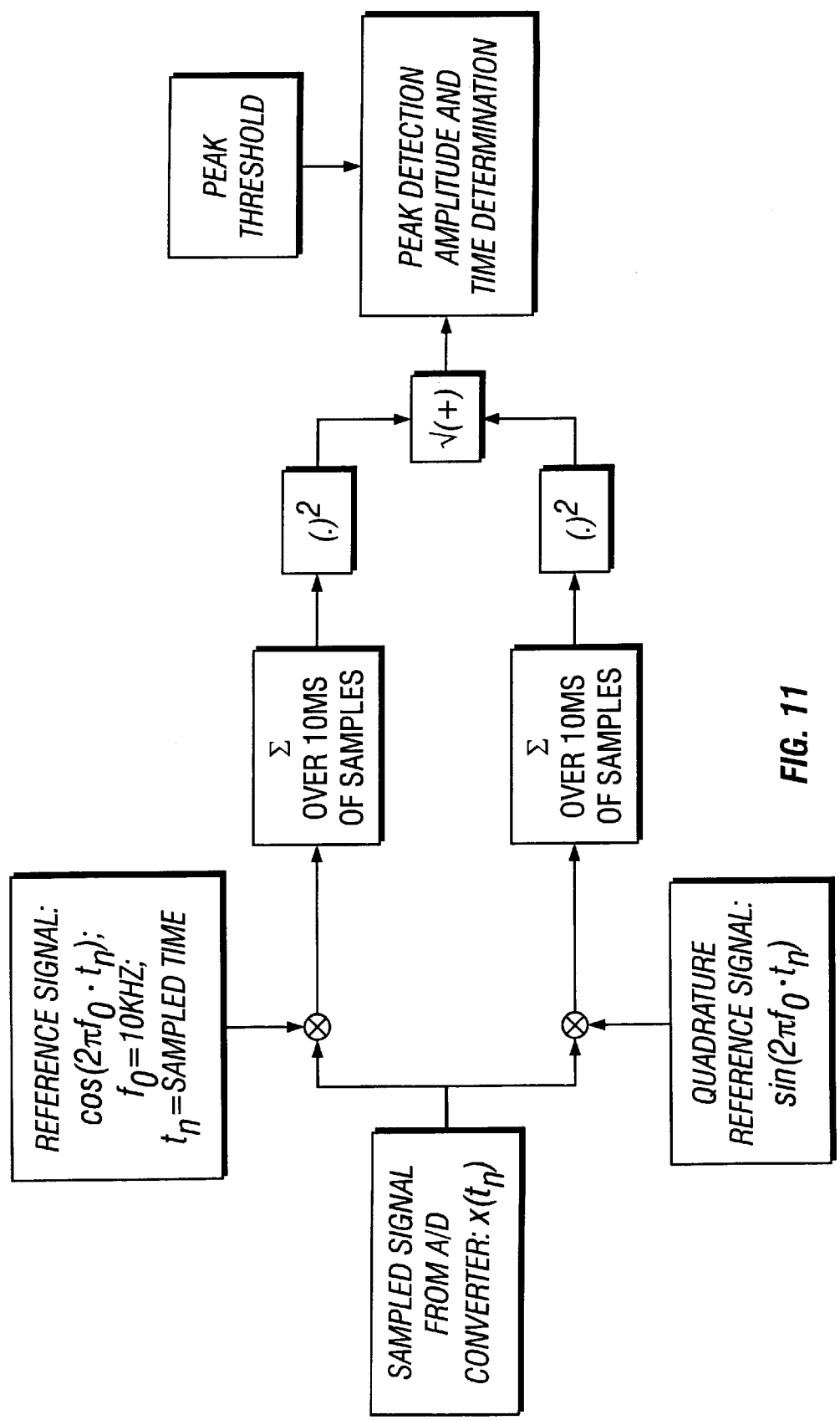
FIG. 11 is a schematic of the circuit used to extract the carrier signal portion of the transmitted signal during demodulation and to detect peak amplitude.

Referring once again to FIG. 6, the modulated signal is received (box 14) and demodulated (box 15) to obtain the data contained in the signal. As part of this demodulation function, the carrier is extracted from the modulated signal. FIG. 11 shows a schematic of the demodulation and carrier extraction process. The signal sampled from the analog-to-digital (A/D) converter of the receiver electronics is first continuously multiplied by a reference 10 kHz cosine function and its quadrature sine function. Both results are then summed over 10 milliseconds, squared, and the results are added. The resulting square root corresponds to a phase insensitive cross correlation of the incoming signal with a 10 millisecond, 10 kHz reference pulse. As shown in FIG. 6, after demodulation the next step 16 is to detect a data peak. A peak threshold applied to the cross correlated signal defines a peak or pulse whose time of occurrence and amplitude correspond to a maximum correlation amplitude.

Referring to FIG. 8, the transmitter sends data frame 28 to the receiver. As previously mentioned, each data frame includes a first pulse 29 and a last pulse 30 (synchronization pulses) that indicate the beginning and the end of the data frame. In step 16, the receiver is constantly in a search mode attempting to detect amplitude peaks. When the receiver detects a peak amplitude, the receiver begins a search for a valid data frame 28. The search for a valid data frame is necessary to determine if the detected peak amplitude was data or random noise. To search for a valid frame the receiver checks for the presence of synchronization pulses. Since a data frame has a duration of approximately 21 seconds, the receiver checks the previous 21 seconds for synchronization pulses and valid time of arrival for all intermediate data bearing pulses.

After the detection of a valid data frame, the next step 17 is to reconstruct the 27 bit word at the receiver. This step is a decoding of the pulses positioned in the data frame. Conventional burst mode error detection techniques are now used (box 18) to determine the validity of the transmitted word. Once it has been determined that the transmission is valid, the data is extracted (box 19) from the 27 bit word. In the interpretation of the demodulated signal, the measurement data transmitted in the signal is determined from the positions of the pulses. After step 19, the focus of the procedure turns to the process of determining the formation resistivity. Step 20 measures the amplitude of the carrier signal used during the transmission of the data. Formation resistivity is determined (box 21) by comparison of the amplitude of the received signal with that of the transmitted signal.

Figure 12A:
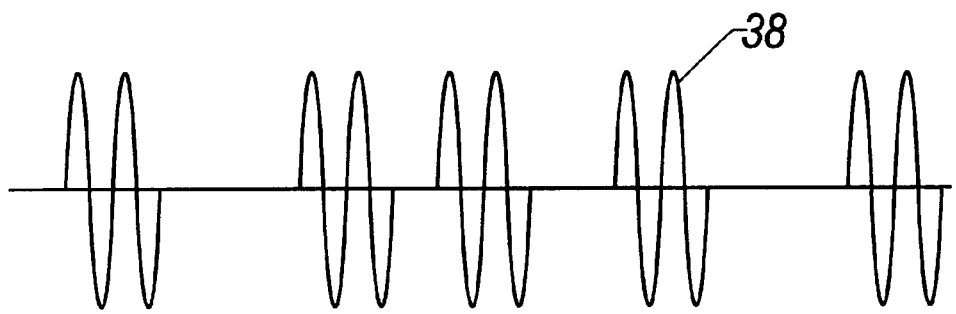
FIGS. 12a and 12b illustrate respectively modulated signals as transmitted and as received in the present invention.
Figure 12B:
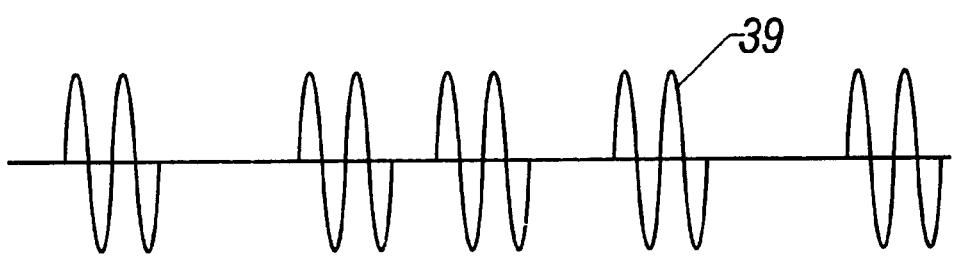
Figure 14:
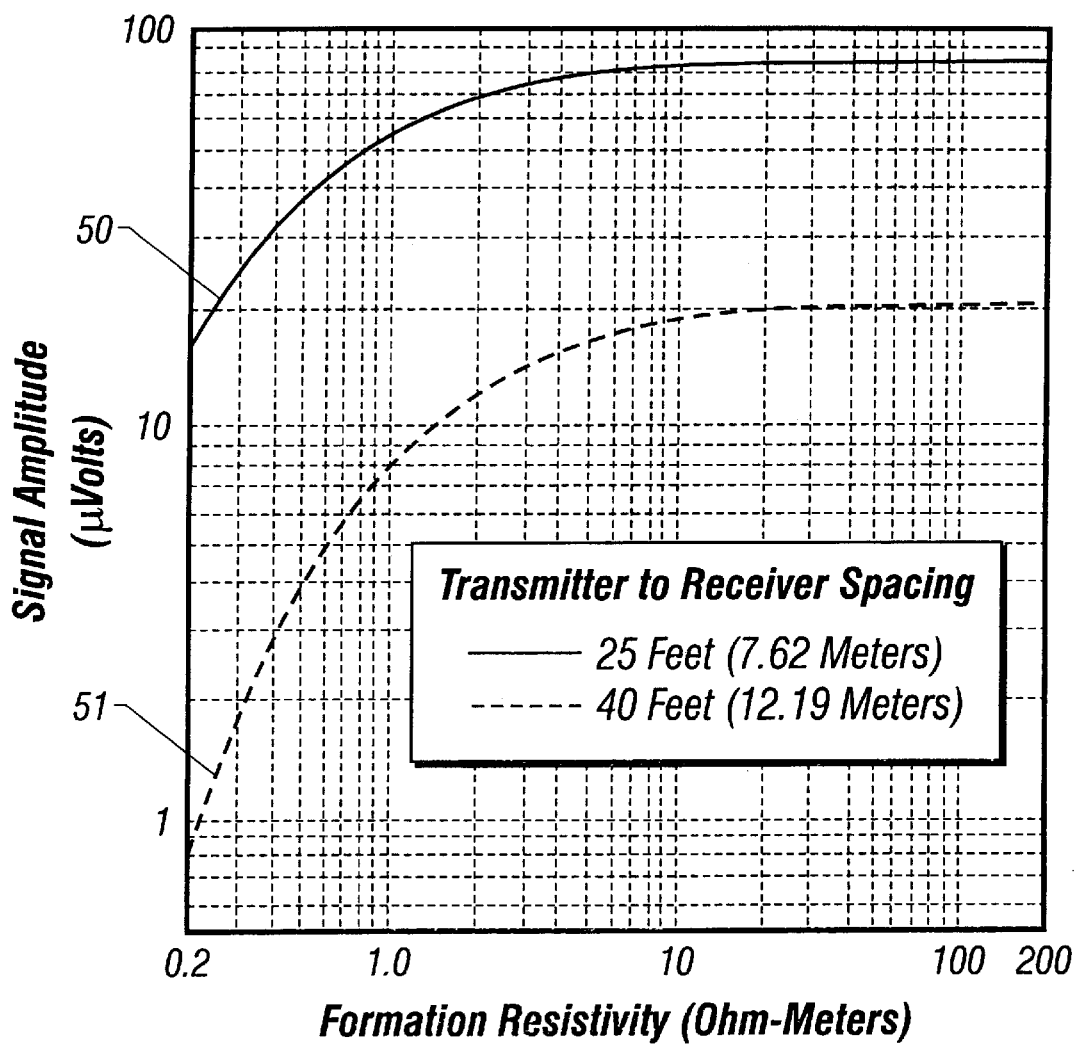
FIG. 14 is a plot of the signal amplitude resistivity transform for a two-coil deep resistivity measurement system of the present invention.

FIG. 12a illustrates the signal 38 as transmitted. FIG. 12b illustrates the signal 39 as received. As shown, the received signal 39 resembles the transmitted signal 38. However, because the surrounding earth formation attenuates the carrier signal, the received signal 39 has a much smaller amplitude than the transmitted signal. The formation resistivity is calculated from a resistivity transform that is dependent upon transmitter to receiver spacing in a homogeneous formation as shown in FIG. 14. Where the well trajectory is at a relatively low apparent dip angle within geometrically complicated formation layers, the signal amplitude and a forward modeling of the formation layers must be used to estimate a resistivity representation of the layers.

Figure 13:
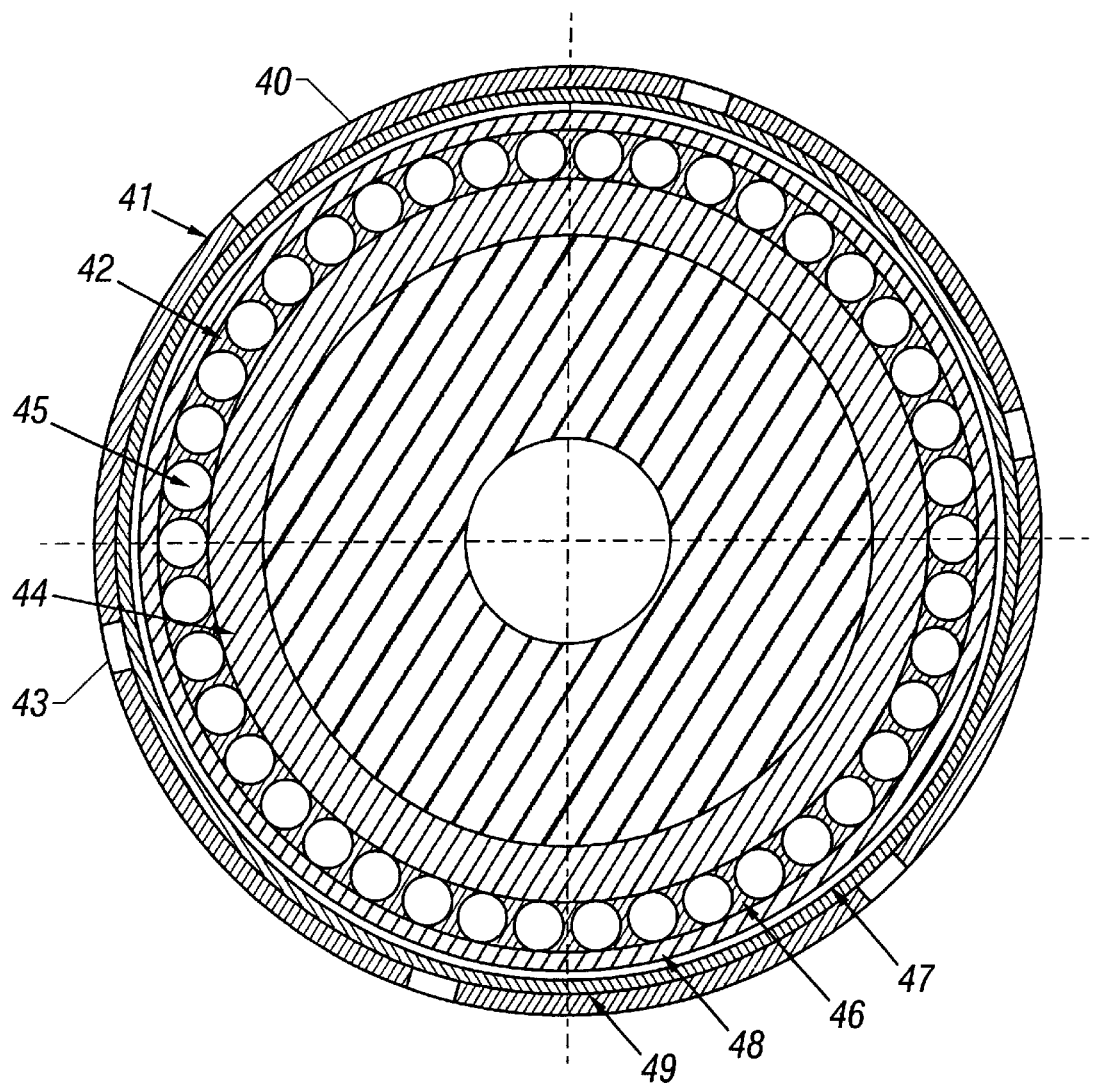
FIG. 13 is a cross-sectional view of the transmitter of the present invention.

As previously stated, in order to increase the transmission range of the signal and therefore the depth of investigation of the resistivity measurement, both the transmitter and receiver are loaded with a ferrite core. Ferrite, or any material with high longitudinal magnetic permeability, has a focusing effect on the longitudinal magnetic field used by the induction transmission of the present invention. FIG. 13 shows a cross-sectional view of the transmitter 40 of the present invention. A protective electromagnetic transparent shield 41 encloses the antenna 42. This shield has slots 43 that provide for the electromagnetic transmission of the signals. In this embodiment, the antenna 42 is comprised of a pressure tight spindle 44. Ferrite bars 45 are longitudinally embedded in the spindle 44. Around the ferrite bars is wiring in the form of a coil 46. An epoxy ring 48 is adjacent the coil and ferrite bars. The coil is sealed by a VITON rubber ring 47 for protection against borehole fluids. A slight void 49 exists between the shield 41 and the VITON rubber ring 47 to allow for expansion of the ring 47 during operation.

The resistivity response or resistivity transform of the system of the present invention is shown in FIG. 14 for a signal amplitude measurement. FIG. 14 shows the signal amplitude versus formation resistivity for 25 foot (7.62 meter) and 40 foot (12.19 meter) 50 and 51, respectively, transmitter to receiver spacings. As shown, the relative change in signal amplitude as a function of resistivity is greater with the 25 foot measurement than with the 40 foot measurement. In both measurements, the ability to measure resistivity based on signal amplitude is minimal above approximately 20 ohm-meters.

One method for extending the range of measurable formation resistivities above 20 ohmmeters is to use the complex composition of the signal as in the standard induction technique. The resistivity measurement includes the real component 54 ($V_R$) and the imaginary component 53 ($V_I$) of the signal as shown in FIGS. 15a and 15b. As indicated in FIGS. 15b and 15d, the real component 54 has a greater sensitivity to formation resistivity than the imaginary component 53 and can discriminate resistivity as a function of signal amplitude over a greater range. Since the present measurement is an amplitude measurement 52 ($V_A$) represented by the equation $$V_A = \sqrt{V_R^2 + V_I^2}$$

and does not involve synchronizing of transmitted and received signals, a determination of the real part of the signals is not possible. However, in this asynchronous system the range of formation resistivity discrimination may be extended beyond 20 ohm-meters by using a higher frequency signal, such as 100 kHz, which moves the resistivity transforms 50 and 51 of FIG. 14 to the right towards higher resistivity (approximately 100 ohm-meters). Additionally, the resistivity of the formation at different depths of investigation may be determined from a single transmitted signal by transmitting the signal pulses at different frequencies, each frequency yielding a measurement at a different depth. In the present invention three frequencies, approximately 2, 10, and 100 kHz are preferred. However, frequencies in the range from about 1 kHz to 300 kHz may be used.

Figure 16:
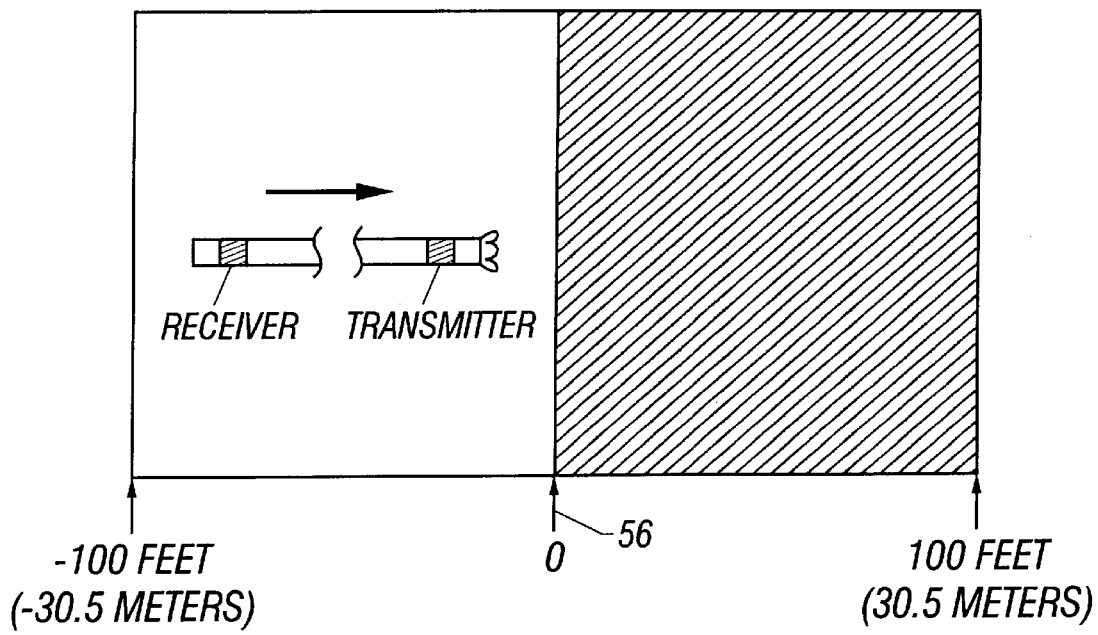
FIG. 16 is a schematic illustration of a tool according to the present invention approaching a resistivity contrast boundary at an apparent dip angle of 90 degrees.
Figure 17A:
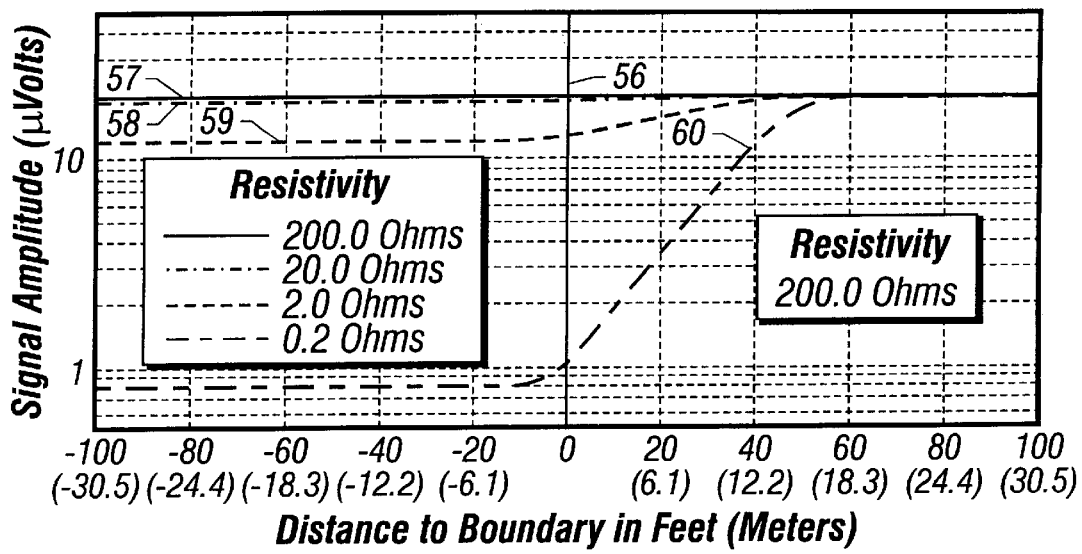
FIG. 17a is a graph of the formation resistivity signal response as the tool of FIG. 16 travels from a low resistivity formation to a high resistivity formation.
Figure 17B:
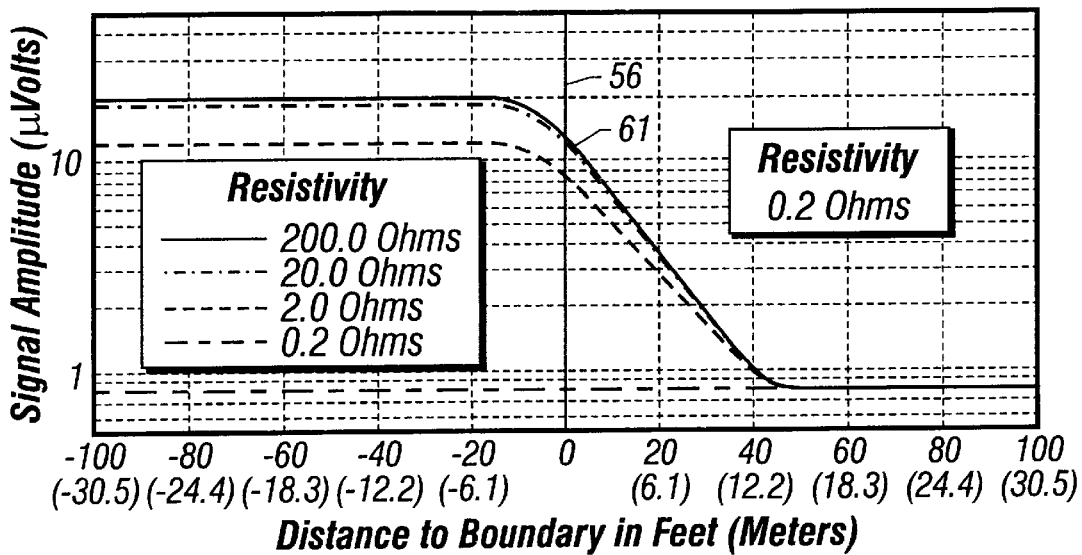
FIG. 17b is a graph of the formation resistivity signal response as the tool of FIG. 16 travels from a high resistivity formation to a low resistivity formation.

Because of its large transmitter to receiver spacing, the present invention provides a deep depth of investigation of formation resistivity. This feature is particularly useful in detecting formation boundaries. FIG. 16 schematically illustrates a tool according to the present invention operating at 10 kHz approaching a resistivity contrast boundary 56 at an apparent dip angle of 90 degrees. FIGS. 17a and 17b show the resistivity signal response as the tool approaches and crosses resistivity boundary 56 at an apparent dip angle of 90 degrees. As shown in FIG. 17a, at 200 ohm-meters 57, there is no change in resistivity across the boundary 56, and therefore no change in the signal. At a contrast of 20 ohm-meters to 200 ohm-meters 58, there is virtually no change in the signal, mainly because of the limited ability to distinguish resistivities above 20 ohm-meters when operating at 10 kHz. At a contrast of 2.0 ohm-meters to 200 ohm-meters 59, there is a slight movement in the signal approximately ten feet (3 meters) before the tool reaches the boundary 56 and more movement after it crosses the boundary. At 0.2 ohm-meters to 200 ohm-meters 60, the signal begins to change rapidly approximately five feet (1.5 meters) before the tool crosses the boundary 56. FIG. 17b shows that the responses are the opposite when moving from a high resistivity formation to a low resistivity formation. There is a 10 to 15 foot (3–4.5 meter) look ahead 61 when approaching the boundary 56 from a resistive to a conductive formation.

Figure 18:
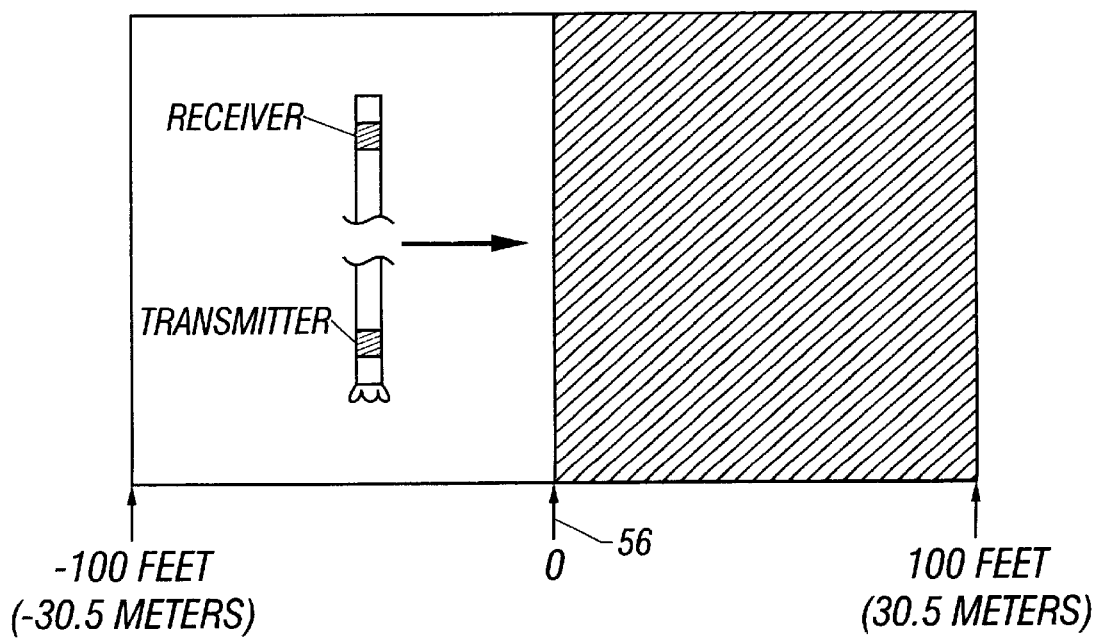
FIG. 18 is a schematic illustration of a tool according to the present invention approaching a resistivity contrast boundary at an apparent dip angle of 0 degrees.
Figure 19A:
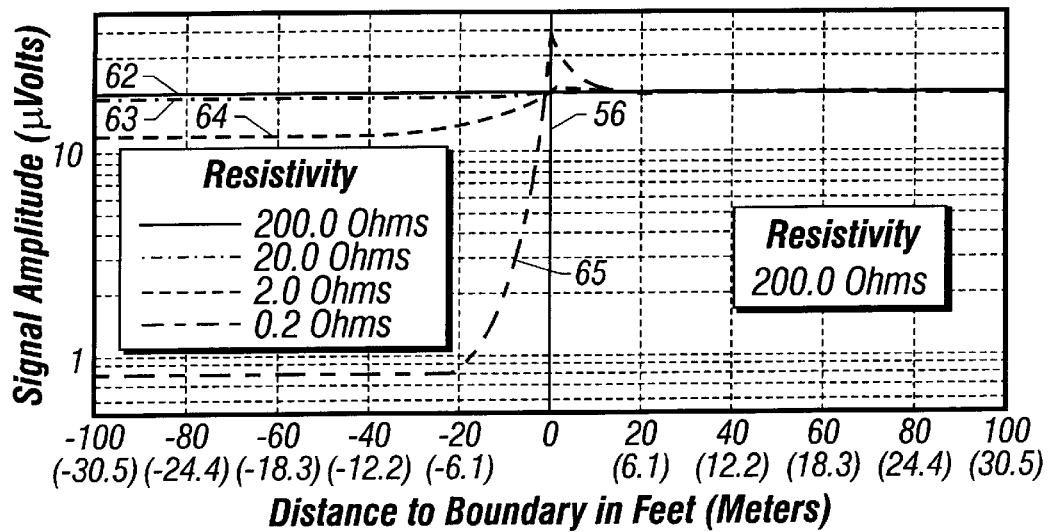
FIG. 19a is a graph of the formation resistivity signal response as the tool of FIG. 18 travels from a low resistivity formation to a high resistivity formation.
Figure 19B:
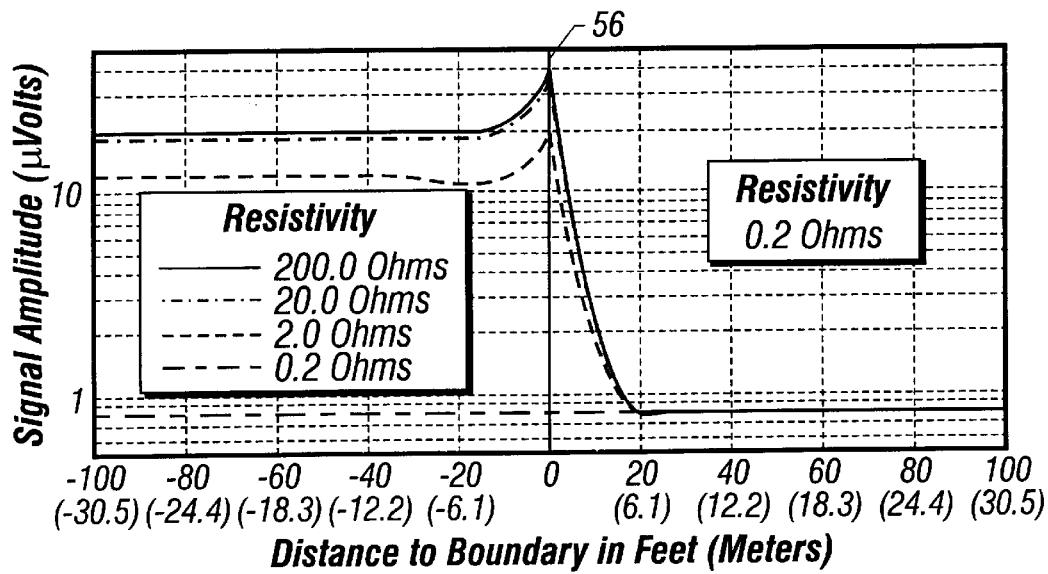
FIG. 19b is a graph of the formation resistivity signal response as the tool of FIG. 18 travels from a high resistivity formation to a low resistivity formation.

FIG. 18 schematically illustrates a tool according to the present invention operating at 10 kHz approaching a resistivity contrast boundary 56 at an apparent dip angle of 0 degrees. FIG. 19a illustrates the resistivity signal response as the tool moves from a low resistivity formation to a high resistivity formation at an apparent dip angle of 0 degrees. There is of course no change in the 200 ohm-meter response 62 across the boundary. Again, the 20 ohm-meter response 63 shows virtually no change across the boundary 56. The 2.0 ohm-meter response 64 begins to respond at approximately 40 feet (12.2 meters) from the boundary. The 0.2 ohm-meter response 65 begins to show a drastic change at about 25 feet (7.6 meters) from the boundary. The well known horizontal or high angle horning effect when crossing a formation boundary causes the 0.2 ohm-meter response to exceed the 200 ohm-meter level and then return to the 200 ohm-meter level. As shown in FIG. 19b, the tool response when moving from a high resistivity formation to a low resistivity formation is essentially the opposite of that shown in FIG. 19a.

The present invention therefore provides a formation resistivity measurement with the following characteristics: 1) deep resistivity radial depth of investigation proportional to the distance between the transmitter and receiver; 2) vertical resolution also proportional to the distance between the transmitter and receiver; 3) formation resistivity sensitivity of up to approximately 20 ohm-meters when using the pulse amplitude resistivity transform at 10 kHz operating frequency, or sensitivity up to approximately 100 ohm-meters at 100 kHz operating frequency; 4) the capability to detect formation boundaries based on changes in formation resistivity; 5) look-ahead capability when the bit is crossing from a low resistivity formation to a high resistivity formation; and 6) look-around capability in wells drilled approximately parallel to formation boundaries of any significant resistivity contrast. This application is significant for landing wells and staying within a predefined formation layer during directional drilling.

It will be recognized that new and improved methods and apparatus have been disclosed which meet all the objectives and have all the features and advantages of the present invention. Since certain changes or modifications may be made in the disclosed embodiments without departing from the inventive concepts involved, it is the aim of the appended claims to cover all such changes and modifications falling within the true scope of the present invention.

We claim:

1. A method of measuring a property of an earth formation and simultaneously transmitting information through said earth formation, said method comprising the steps of:
   transmitting an electromagnetic induction signal into said earth formation from a first location in a borehole drilled therein, wherein a first characteristic of said signal is altered by passage through said earth formation, and a second characteristic of said signal is modulated to carry encoded information;
   receiving said signal at a second location in said borehole;
   demodulating said received signal to yield said encoded information; and
   determining said property of said earth formation from said first characteristic of said received signal.

2. The method of claim 1 wherein said property of said earth formation is electrical resistivity.

3. The method of claim 1 wherein said first characteristic of said signal is amplitude.

4. The method of claim 1 wherein said signal comprises a sequence of pulses and said second characteristic of said signal is the time of occurrence of said pulses.

5. The method of claim 4 wherein said property of said earth formation is resistivity and said pulses are at a plurality of frequencies resulting in measurement of said resistivity at a plurality of depths into said earth formation.

6. The method of claim 5 wherein said plurality of frequencies are in the range from about 1 kiloHertz to 300 kilohertz.

7. The method of claim 4 wherein each pulse of said sequence of pulses comprises a peak amplitude and said time of occurrence of said pulse is measured at said peak amplitude.

8. The method of claim 4 wherein the time of occurrence of each pulse of said sequence of pulses corresponds to a portion of a binary word.

9. An apparatus for measuring a property of an earth formation surrounding a borehole and telemetering information through said earth formation, said apparatus comprising:
   a transmitter for emitting an electromagnetic induction signal into said earth formation at a first location in said borehole, a first characteristic of said signal being altered by passage through said earth formation, and wherein a second characteristic of said signal is modulated to carry encoded information;
   a receiver for receiving said signal at a second location in the borehole;
   means for demodulating said received signal to yield said encoded information; and
   means for determining said property of said earth formation from said first characteristic of said received signal.

10. The apparatus of claim 9 wherein said property of said earth formation is electrical resistivity.

11. The apparatus of claim 9 wherein said characteristic of said signal is amplitude.

12. The apparatus of claim 9 wherein said signal comprises a sequence of pulses and said second characteristic of said signal is the time of occurrence of said pulses.

13. The apparatus of claim 12 wherein said property of said earth formation is resistivity and said pulses are at a plurality of frequencies resulting in measurement of said resistivity at a plurality of depths into said earth formation.

14. The apparatus of claim 13 wherein said plurality of frequencies are in the range from about 1 kiloHertz to 300 kiloHertz.

15. The apparatus of claim 9 wherein said transmitter and said receiver are mounted in separate subs adapted for connection in a drill string.

16. The apparatus of claim 15 further comprising a measurement while drilling tool including a mud pulse telemetry system.

17. An apparatus for measuring the resistivity of an earth formation surrounding a borehole and telemetering information while drilling said borehole, said apparatus comprising:
   a bottom hole assembly supported for rotation by a drill string, said bottom hole assembly including:
      a drilling motor having a bit shaft terminating in a bit box, said bit box having a drill bit attached thereto;
      instrument means for sensing one or more drilling and/or earth formation parameters and encoding said sensed parameters for transmission uphole;
      a transmitter for emitting an electromagnetic induction signal into said earth formation, said signal carrying said encoded sensed parameters, and wherein a characteristic of said signal is altered by passage through said earth formation;
      a receiver for receiving said signal;
      means for decoding said received signal to yield said drilling and/or earth formation parameters; and
      means for determining the resistivity of said earth formation from said characteristic of said received signal.

18. The apparatus of claim 17 wherein said instrument means is mounted in said bit box.

19. The apparatus of claim 17 wherein said bottom hole assembly further comprises a telemetry system for telemetering said drilling and/or said earth formation parameters, and/or said earth formation resistivity, to the earth's surface.

20. The apparatus of claim 17 wherein said characteristic of said signal is amplitude.

21. The apparatus of claim 18 wherein said transmitter is mounted in said bit box.

22. A method for controlled directional drilling of a borehole in an earth formation, said method comprising the steps of:
   transmitting an electromagnetic induction signal into said earth formation from a first location in said borehole, wherein a first characteristic of said signal is altered by passage through said earth formation, and a second characteristic of said signal is modulated to carry encoded information;
   receiving said signal at a second location in said borehole;
   demodulating said received signal to yield said encoded information;
   determining a property of said earth formation from said first characteristic of said received signal; and
   controlling the drilling of said borehole in response to said determined property of said earth formation.

23. The method of claim 22 wherein said property of said earth formation is electrical resistivity.

24. The method of claim 23 wherein said signal is an electromagnetic induction signal.

25. The method of claim 23 wherein said first characteristic of said signal is amplitude.

26. The method of claim 25 wherein the frequency of said pulses is 10 kilohertz.

27. The method of claim 22 wherein said encoded information comprises the direction and/or inclination of said borehole.

28. The method of claim 27 wherein the drilling of said borehole is further controlled in response to a portion of said encoded information.

29. An apparatus for controlled directional drilling of a borehole in an earth formation, said apparatus comprising:
- a bottom hole assembly supported for rotation by a drill string, said bottom hole assembly including:
  - a drilling motor incorporating a bent housing therein and having a bit shaft terminating in a bit box, said bit box having a drill bit attached thereto;
  - instrument means for sensing one or more drilling and/or earth formation parameters and encoding said sensed parameters for transmission uphole;
  - A transmitter for emitting an electromagnetic induction signal into said earth formation, said signal carrying said encoded sensed parameters, and wherein a characteristic of said signal is altered by passage through said earth formation;
  - a receiver for receiving said signal;
  - means for decoding said received signal to yield said drilling and/or earth formation parameters;
  - means for determining the resistivity of said earth formation from said characteristic of said received signal; and
  - means for controlling the drilling of said borehole in response to the resistivity of said earth formation.

30. The apparatus of claim 29 wherein said instrument means comprises means for sensing the inclination of said borehole.

31. The apparatus of claim 30 wherein said means for controlling the drilling of said borehole in response to the resistivity of said earth formation further controls said drilling in response to the inclination of said borehole.

32. The apparatus of claim 30 wherein said instrument means is mounted in said bit box.

33. The apparatus of claim 29 wherein said characteristic of said signal is amplitude.

34. The apparatus of claim 29 wherein said bottom hole assembly further comprises a telemetry system for telemetering said drilling and/or said earth formation parameters, and/or said earth formation resistivity, to the earth's surface.

* * * * *